(12) United States Patent
Shmueli et al.

(10) Patent No.: US 11,656,328 B2
(45) Date of Patent: May 23, 2023

(54) VALIDATING OBJECT DETECTION HARDWARE AND ALGORITHMS

(71) Applicant: Blue White Robotics Ltd, Tel Aviv (IL)

(72) Inventors: Aviram Shmueli, Modi'in (IL); Alon Ascher, Tel Aviv (IL); Ben Alfi, Tel Aviv (IL); Shmuel Ur, Shorashim (IL)

(73) Assignee: Blue White Robotics Ltd, Tel Aviv (IL)

( * ) Notice: Subject to any disclaimer, the term of this patent is extended or adjusted under 35 U.S.C. 154(b) by 291 days.

(21) Appl. No.: 16/889,966

(22) Filed: Jun. 2, 2020

(65) Prior Publication Data
US 2021/0374438 A1  Dec. 2, 2021

(51) Int. Cl.
| | |
|---|---|
| *G01S 13/86* | (2006.01) |
| *G01S 7/40* | (2006.01) |
| *G01S 13/931* | (2020.01) |
| *G01S 17/931* | (2020.01) |
| *G06V 20/58* | (2022.01) |
| *G06F 18/22* | (2023.01) |
| *G06V 10/776* | (2022.01) |

(52) U.S. Cl.
CPC ......... *G01S 7/4004* (2013.01); *G01S 13/867* (2013.01); *G01S 13/931* (2013.01); *G01S 17/931* (2020.01); *G06F 18/22* (2023.01); *G06V 10/776* (2022.01); *G06V 20/58* (2022.01); *G01S 2013/932* (2020.01)

(58) Field of Classification Search
CPC .... G01S 13/867; G01S 13/931; G01S 13/933; G01S 13/937; G01S 15/931; G01S 17/931; G01S 2013/932; G01S 2013/9323; G01S 7/4004; G01S 7/497; G01S 7/52004; G06V 20/58; G06K 9/6215; G06K 9/6262
See application file for complete search history.

(56) References Cited

U.S. PATENT DOCUMENTS

| | | | | |
|---|---|---|---|---|
| 5,245,347 | A  * | 9/1993 | Bonta | G01S 7/36 |
| | | | | 342/149 |
| 2018/0074185 | A1* | 3/2018 | Capraro | G01S 13/5244 |
| 2020/0094849 | A1* | 3/2020 | Weber | B60W 50/0225 |
| 2020/0276983 | A1* | 9/2020 | Iida | G06V 20/58 |

* cited by examiner

*Primary Examiner* — Timothy A Brainard

(57) ABSTRACT

Presented herein are systems and methods for automatically evaluating detection accuracy of dynamic objects by equipment under test, comprising receiving a first record generated by an evaluated equipment under test and a second record generated by a validated reference equipment both deployed in a vehicle, the first record comprising a plurality of attributes of dynamic object(s) detected by the evaluated equipment and the second record comprising a plurality of attributes of dynamic object(s) detected by the reference equipment, correlating between dynamic object(s) detected by both the evaluated equipment and the reference equipment according to matching spatial and temporal attributes of the dynamic object(s) in the first record and in the second record, analyzing at least some of the attributes of the respective dynamic object in the first record compared to the second record, and outputting an indication of differences identified between the first record and the second record.

18 Claims, 4 Drawing Sheets

VALIDATING OBJECT DETECTION HARDWARE AND ALGORITHMS

FIELD AND BACKGROUND OF THE INVENTION

The present invention, in some embodiments thereof, relates to validating object detection equipment, and, more specifically, but not exclusively, to validating object detection equipment under test based on correlation with objects detected by validated reference object detection equipment.

Object detection has become a corner stone technology for a plurality of applications ranging across numerous fields and markets with high emphasis on the constantly and rapidly advancing field of partially automated vehicles and eventually autonomous vehicles.

Object detection typically combines the use of various sensors configured and deployed to collect and capture sensory data and object detection algorithms designed, configured and applied to analyze the captured sensory data in order to detect and classify objects, identify attributes of the detected objects and generally map the environment of the vehicle in an accurate, reliable and consistent manner.

SUMMARY OF THE INVENTION

According to a first aspect of the present invention there is provided a method of automatically evaluating detection accuracy of dynamic objects by equipment under test, comprising using one or more processors for:

Receiving a first record generated by an evaluated equipment under test which is deployed in a vehicle. The first record comprising a plurality of attributes of each dynamic object detected by the evaluated equipment in an environment of the vehicle.

Receiving a second record generated by a validated reference equipment deployed in the vehicle. The second record comprising a plurality of attributes of each dynamic object detected in the environment by the reference equipment.

Correlating between one or more dynamic objects detected by the evaluated equipment and a respective dynamic object detected by the reference equipment according to a match between one or more spatial attributes and one or more temporal attributes of the plurality of attributes of the respective dynamic object in the first record and in the second record.

Analyzing at least some of the plurality of attributes of the respective dynamic object in the first record compared to respective attributes of the respective dynamic object in the second record.

Outputting an indication of one or more differences between the first record and the second record identified based on the analysis.

According to a second aspect of the present invention there is provided a system for automatically evaluating accuracy of dynamic objects by equipment under test, comprising an input interface, an output interface, and one or more processors coupled to the input interface and to the output interface. The one or more processors executing a code comprising:

Code instructions to receive a first record generated by an evaluated equipment under test which is deployed in a vehicle. The first record comprising a plurality of attributes of each dynamic object detected by the evaluated equipment in an environment of the vehicle.

Code instructions to receive a second record generated by a validated reference equipment deployed in the vehicle. The second record comprising a plurality of attributes of each dynamic object detected in the environment by the reference equipment.

Code instructions to correlate between one or more dynamic objects detected by the evaluated equipment and a respective dynamic object detected by the reference equipment according to a match between one or more spatial attributes and one or more temporal attributes of the plurality of attributes of the respective dynamic object in the first record and in the second record.

Code instructions to analyze at least some of the plurality of attributes of the respective dynamic object in the first record compared to respective attributes of the respective dynamic object in the second record.

code instructions to output an indication of one or more differences between the first record and the second record identified based on the analysis.

In an optional implementation form of the first and/or second aspects, a plurality of differences identified between the first record and the second record are analyzed to identify one or more error patterns in the detection of the one or more dynamic object by one or more of: the evaluated equipment and the reference equipment.

In a further implementation form of the first and/or second aspects, the evaluated equipment and the reference equipment each comprises one or more members of a group consisting of: a sensor and an object detection algorithm.

In a further implementation form of the first and/or second aspects, the evaluated equipment and the reference equipment each comprises one or more members of a group consisting of: a sensor and an object detection algorithm.

In a further implementation form of the first and/or second aspects, the sensor is a member of a group consisting of: an imaging sensor, a LiDAR sensor, a RADAR sensor and an ultrasonic sensor.

In a further implementation form of the first and/or second aspects, the vehicle is a member of a group consisting of: a ground vehicle, an aerial vehicle and a naval vehicle.

In a further implementation form of the first and/or second aspects, the evaluated equipment and the reference equipment each comprises one or more members of a group consisting of: a sensor and an object detection algorithm.

In a further implementation form of the first and/or second aspects, the one or more spatial attributes comprise one or more members of a group consisting of: a location, a direction, a speed, an acceleration and an advancement vector.

In a further implementation form of the first and/or second aspects, the one or more spatial attributes are defined according to one or more global coordinate system applied for the environment and/or relatively to the vehicle.

In a further implementation form of the first and/or second aspects, the one or more spatial attributes are defined according to a relative initial spatial positioning of the evaluated equipment with respect to the relative initial spatial positioning of the reference equipment. The spatial positioning comprises one or more members of a group consisting of: a position, a location, a direction, and a field of view.

In a further implementation form of the first and/or second aspects, the one or more temporal attributes comprise: a time of detection, a first time of detection, a last time of detection and a detection duration, wherein the one or more temporal attribute is based on a common time reference.

In an optional implementation form of the first and/or second aspects, one or more of the objects and the respective object(s) are correlated according to a match between the one or more spatial attributes in the first record and in the second record over a predefined time period determined based on the one or more temporal attributes in the first record and in the second record.

In a further implementation form of the first and/or second aspects, the plurality of attributes comprises one or more members of a group consisting of: a classification label, a physical dimension, a color, a shape and a texture.

In an optional implementation form of the first and/or second aspects, one or more of the plurality of attributes of the respective object extracted from the first record and/or the second record are adjusted to form a standard representation of the one or more attributes for the comparison analysis.

In an optional implementation form of the first and/or second aspects, each object detected by the evaluated equipment and/or by the reference equipment is classified into one of a plurality of groups based on the correlation. The plurality of groups comprising: a first group of objects detected only by the reference equipment, a second group of objects detected only by the evaluated equipment, a third group of objects detected by both the evaluated equipment and the reference equipment and classified similarly and a fourth group of objects detected by both the evaluated equipment and the reference equipment but classified differently.

In an optional implementation form of the first and/or second aspects, sensory data captured by the evaluated equipment is analyzed compared to corresponding sensory data captured by the reference equipment in order to evaluate performance of the evaluated equipment.

In an optional implementation form of the first and/or second aspects, one or more of a plurality of detected objects are excluded from the difference indication according to one or more filters.

In an optional implementation form of the first and/or second aspects, in case both the evaluated equipment and the reference equipment utilize the same object detection equipment, a difference between the first record and the second record is insignificant.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks automatically. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of methods and/or systems as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars are shown by way of example and for purposes of illustrative discussion of embodiments of the invention. In this regard, the description taken with the drawings makes apparent to those skilled in the art how embodiments of the invention may be practiced.

In the drawings.

DESCRIPTION OF SPECIFIC EMBODIMENTS OF THE INVENTION

Figure 1:
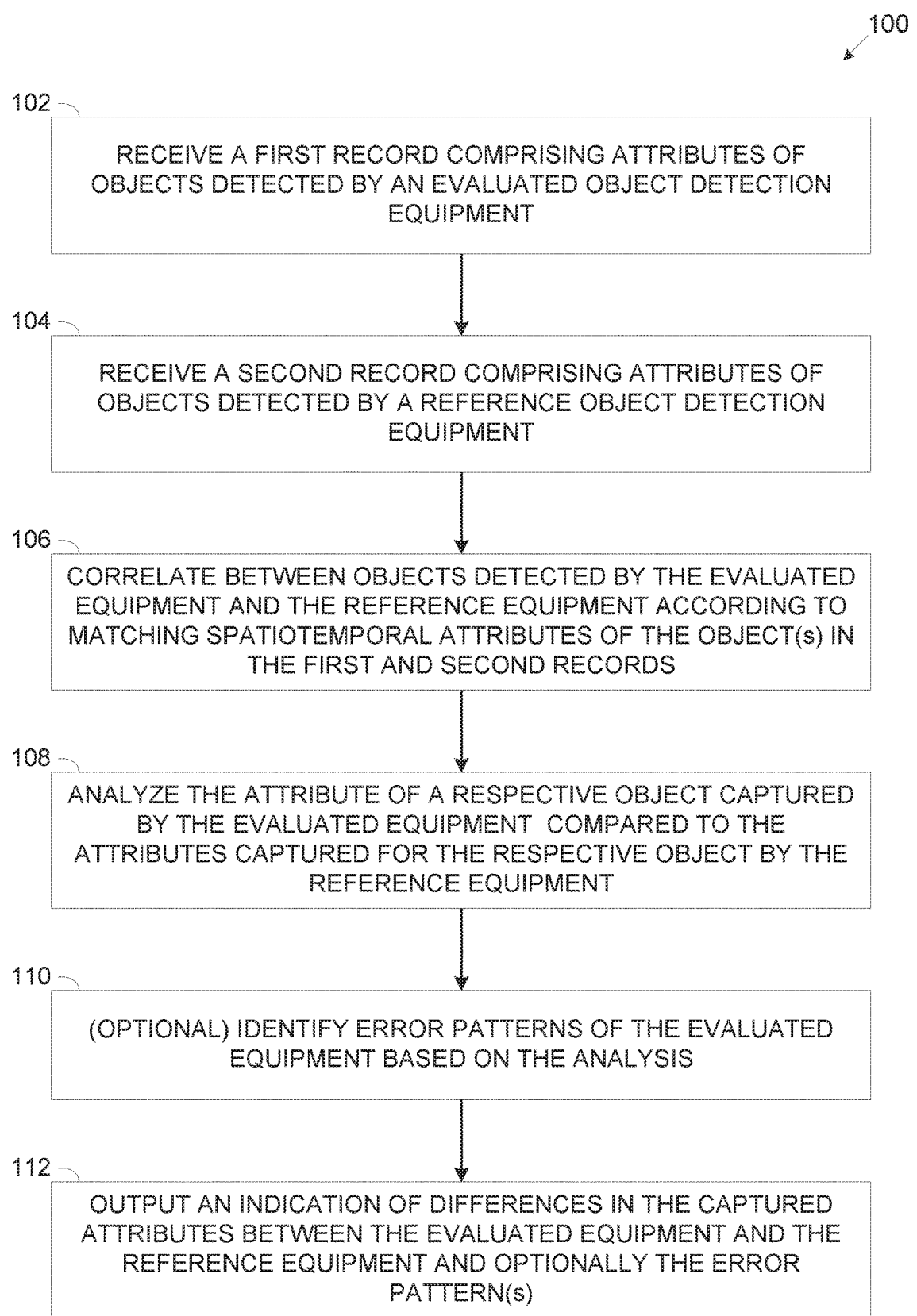
FIG. 1 is a flowchart of an exemplary process of validating object detection of an object detection equipment under test compared to validated reference object detection equipment, according to some embodiments of the present invention.

The present invention, in some embodiments thereof, relates to validating object detection equipment, and, more specifically, but not exclusively, to validating object detection equipment under test based on correlation with objects detected by validated reference object detection equipment.

According to some embodiments of the present invention, there are provided methods, systems and computer program products for automatically evaluating object detection performance, for example, accuracy, reliability, consistency and/or the like of an evaluated equipment under test. The valuation is based on correlation of detected objects and their features as detected by the evaluated equipment with respective objects detected by a reference equipment which performance is already validated. Optionally, the reference equipment which performance may be considered as validated if the reference equipment is produced, tested, evaluated, validated and/or otherwise acknowledged by a global leader and/or set by well-known global performance reference.

The evaluated equipment and the reference equipment may each include hardware, specifically a set of one or more sensors, for example, an imaging sensor (e.g. camera, infrared sensor, thermal camera, etc.), a Light Imaging Detection and Ranging (LiDAR) sensor, a RAdio Detection and Ranging (RADAR) sensor, SOund NAvigation Ranging (SONAR) and/or the like and/or one or more object detection algorithms for example, a machine learning model, a neural network, a Support Vector Machine (SVM), an image processing algorithm, a computer vision algorithm, a signal processing algorithm and/or the like. However, the evaluated equipment and the reference equipment may typically comprise a combination of hardware sensor(s) and object detection algorithms.

The evaluated equipment and the reference equipment which may be deployed in one or more manually operated, autonomous and/or semi-autonomous ground, aerial and/or naval vehicles may be both designed, configured and/or operated to detect one or more objects, specifically dynamic objects in the environment of the vehicle, for example, other vehicles, pedestrians, people, animals and/or the like.

The evaluated equipment and the reference equipment, specifically the hardware sensors sets used by the evaluated equipment and the reference equipment may be deployed, for example, integrated, mounted, attached and/or the like such that the Field of View (FOV) of the sensor sets overlaps at least partially. Moreover, the positioning of the sensor set used by the evaluated equipment, for example, a position, a location, an orientation, a direction, an FOV and/or the like may be loosely and relatively defined with respect to the positioning of the sensor set used by the reference equipment, for example, based on an initial spatial positioning of each of the sensors sets, based on a Global Positioning System (GPS) and/or the like. The evaluated equipment and the reference equipment may use a common time reference.

The evaluated equipment and the reference equipment may be configured to identify one or more attributes of each detected object, for example, spatiotemporal attributes comprising one or more spatial attributes such as, for example, a location, a direction, a speed, an acceleration, an advancement vector and/or the like and one or more temporal attributes, for example, a time of detection, a first time of detection, a last time of detection, a detection duration, and/or the like. The spatial attributes identified by each of the evaluated equipment and the reference equipment may be defined according to the global and/or relative positioning of the sensor sets used by the evaluated equipment and the reference equipment. The temporal attributes identified by each of the evaluated equipment and the reference equipment may be defined according to the common time reference.

The evaluated equipment and the reference equipment may be further configured to identify one or more other (additional) attributes of each detected object, for example, a physical dimension, a color, a shape, a texture, and/or the like. The evaluated equipment and the reference equipment may further classify one or more of the detected objects to respective classes (labels).

The evaluated equipment and the reference equipment may each generate a respective object detection record comprising the objects detected by the evaluated equipment and the reference equipment and the attributes identified for the detected objects.

A first record generated by the evaluated equipment may be analyzed with respect to a second record generated by the reference equipment to correlate between one or more objects detected by the evaluated equipment and respective object(s) detected by the reference equipment. In particular, the correlation may be done according to a match between at least one spatial attribute and at least one temporal attribute of one or more objects in the first and second records which indicates that the respective object(s) occupies the same space at the same time and hence is the same object(s) detected by both the evaluated equipment and the reference equipment.

Optionally, the correlation may be done over a predefined time period, for example, one millisecond, 100 milliseconds, half second, one second, etc. which is sufficiently short with respect to movement speed of the dynamic objects detected by the evaluated equipment and the reference equipment to ensure that object detectable in the FOV of the sensor(s) are not missed. As such, the correlation may be done based on the predefined time period which may encompass one or more samples of each of the different sensors having different sampling time and/or different sampling frequency. Applying the predefined time period may therefore support usage of different sensors by the evaluated equipment and by the reference equipment, specifically different sensors having different operational parameters, for example, different sampling time and/or different sampling frequency. Therefore, while the evaluated equipment and by the reference equipment may, to some extent, be non-synchronized observation systems, the predefined time period may ensure that both systems sample real world attributes in a very narrow time proximity such that the real world attributes may be considered constant for both samples.

Optionally, the attributes identified by the evaluated equipment and/or the reference equipment may be adjusted to form a common standard representation of the attributes and/or their units.

Based on the correlation, the attributes recorded for the correlated object(s) in the first record may be analyzed compared to the attributes of the respective correlated object(s) recorded in the second record in order to identify differences between the attributes identified by the evaluated equipment and the attributes identified by the reference equipment. The comparison may be directed to identify differences in the spatial attributes, temporal attributes and/or the other attributes.

Optionally, one or more filters may be applied to exclude analysis and comparison of one or more features, objects, attributes and/or the like which are determined to be irrelevant, redundant, ineffective and/or the like.

Optionally, a plurality of differences identified between attributes identified by the evaluated equipment compared to the reference equipment for a plurality of objects may be further analyzed to identify one or more error patterns in the object detection functionality of the evaluated equipment. It is possible that the error patterns may be attributed to the reference equipment in cases where the validated equipment outperforms the reference equipment.

An indication of the identified differences and optionally of the error pattern(s) may be output for review and analysis by one or more users, for example, an expert, a developer and/or the like who may analyze the differences in order to evaluate the performance of the evaluated equipment, for example, accuracy, reliability, consistency, integrity and/or the like.

Optionally, one or more filters may be applied to exclude indication of data relating to one or more features, objects, attributes and/or the like which are determined to be irrelevant, redundant, ineffective and/or the like.

Automatically evaluating object detection performance of the evaluated equipment based on correlation with the reference equipment may present major advantages compared to existing methods and systems for evaluating performance of object detection equipment.

First, some of the existing methods may include manually analyzing the output of the evaluated equipment with respect to the monitored scene (vehicle environment). Such manual analysis may require extensive human resources, specifically expert resources which may be very limited. Also the manual analysis may be highly time consuming thus significantly extending the time required for validating the evaluated equipment. Moreover, any change applied in the evaluated equipment may require repeating the manual analysis thus making each design cycle significantly time and resource consuming. In contrast, automatically analyzing detected objects and their identified attributes as detected by the evaluated equipment compared to respective objects detected by the reference equipment which is already validated and considered reliable and accurate, may significantly reduce computing resources, human resources and/or time for validating the performance of the evaluated object detection equipment.

Moreover, by automatically identifying the differences in object detection attributes between the evaluated equipment and the reference equipment and indicating these differences to the experts of the object detection equipment, the experts may immediately focus on the differences and avoid analyzing the entire object detection data generated by the evaluated equipment which may be extremely large. Naturally, focusing on the differences may significantly reduce the computing resources, human resources and/or time required for validating the performance of the evaluated object detection equipment.

Furthermore, automatically identifying the error patterns in object detection of the evaluated equipment may provide highly useful and effective insights for the experts into the functional patterns, capabilities as well as potential limitation and failure modes of the evaluated equipment thus further reducing the computing resources, human resources and/or time required for validating the performance of the evaluated object detection equipment.

In addition, applying the filters to exclude certain redundant, irrelevant and/or ineffective features, objects and/or attributes from the comparison analysis may significantly reduce the computing resources (e.g. processing resources, processing time, storage resources, etc.) required for analyzing and comparing the object detection data generated by the evaluated equipment and the reference equipment. Also applying the filters to exclude indication of differences in certain features, objects and/or attributes presented to the experts may further focus the expert on analyzing relevant and effective attributes thus further increasing computing and manual resources utilization.

Also, deploying the evaluated equipment and the reference equipment in one or more vehicles and operating the equipment in a plurality of trips optionally in a plurality of driving scenarios (vehicle types, driving profiles, etc.) and/ or a plurality of environmental variations (urban, rural, dense traffic, sparse traffic, etc.) may yield an extremely large comparison dataset which may enable extensive and through validation of the evaluated equipment in a plurality of use cases.

Since the comparison and difference detection is based on loose and relative alignment of the evaluated equipment with the reference equipment eliminates the need for rigid and accurate calibration of the evaluated equipment with respect to the reference equipment as may be done in the existing methods and systems. Such rigid and accurate calibration may be highly difficult to achieve and may require constant complex and expensive calibration means for maintaining the calibration and/or constantly recalibrating the two pieces of equipment.

Correlating the objects detected by the evaluated equipment with objects detected by the reference equipment over the predefined time period may allow using different sensors having different sampling time and/or frequency for the evaluated equipment with and the reference equipment which may enable using higher performance (e.g., higher sampling rate) sensors for the reference equipment thus increasing the accuracy, reliability and/or consistency of the object detection performance evaluation for the evaluated equipment.

Adjusting the attributes identified by the evaluated equipment and the reference equipment to according to the common standard representation and/or format may significantly increase the accuracy of correlation between similar objects detected by the evaluated equipment and the data generated by the reference equipment. Moreover, standardizing the representation of the object detection data generated by both pieces of equipment may simplify the comparison between the object detection data generated by the two and may further simplify the analysis for the experts.

The automated object detection performance evaluation may be further applied to evaluate one version of the object detection equipment compared to another version of the same object detection equipment. For example, when releasing a new version of the object detection equipment comprising, for example, a new software version, a new algorithm, an updated hardware version and/or the like, the newly released version of the object detection equipment may be regarded as the evaluated equipment which is under test. A previous and preferably a stable version of the same object detection equipment may be used as the reference equipment for automatically evaluating the performance of the newly released version of the object detection equipment. This of course may be repeated for one or more additional released versions of the object detection equipment throughout its lifecycle.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer program code comprising computer readable program instructions embodied on a computer readable medium may be transmitted using any appropriate medium, including but not limited to wireless, wire line, optical fiber cable, RF, etc., or any suitable combination of the foregoing.

The computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

The computer readable program instructions for carrying out operations of the present invention may be written in any combination of one or more programming languages, such as, for example, assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages.

The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Referring now to the drawings, FIG. 1 illustrates a flowchart of an exemplary process of validating object detection of an object detection equipment under test compared to validated reference object detection equipment, according to some embodiments of the present invention. An exemplary process 100 may be executed to evaluate and validate detection performance (e.g. accuracy, integrity, reliability, etc.) of an (evaluated) object detection equipment which is under test based on correlation of objects detected by the evaluated object detection equipment with objects detected by a reference object detection equipment which is already tested and validated.

Figure 2:
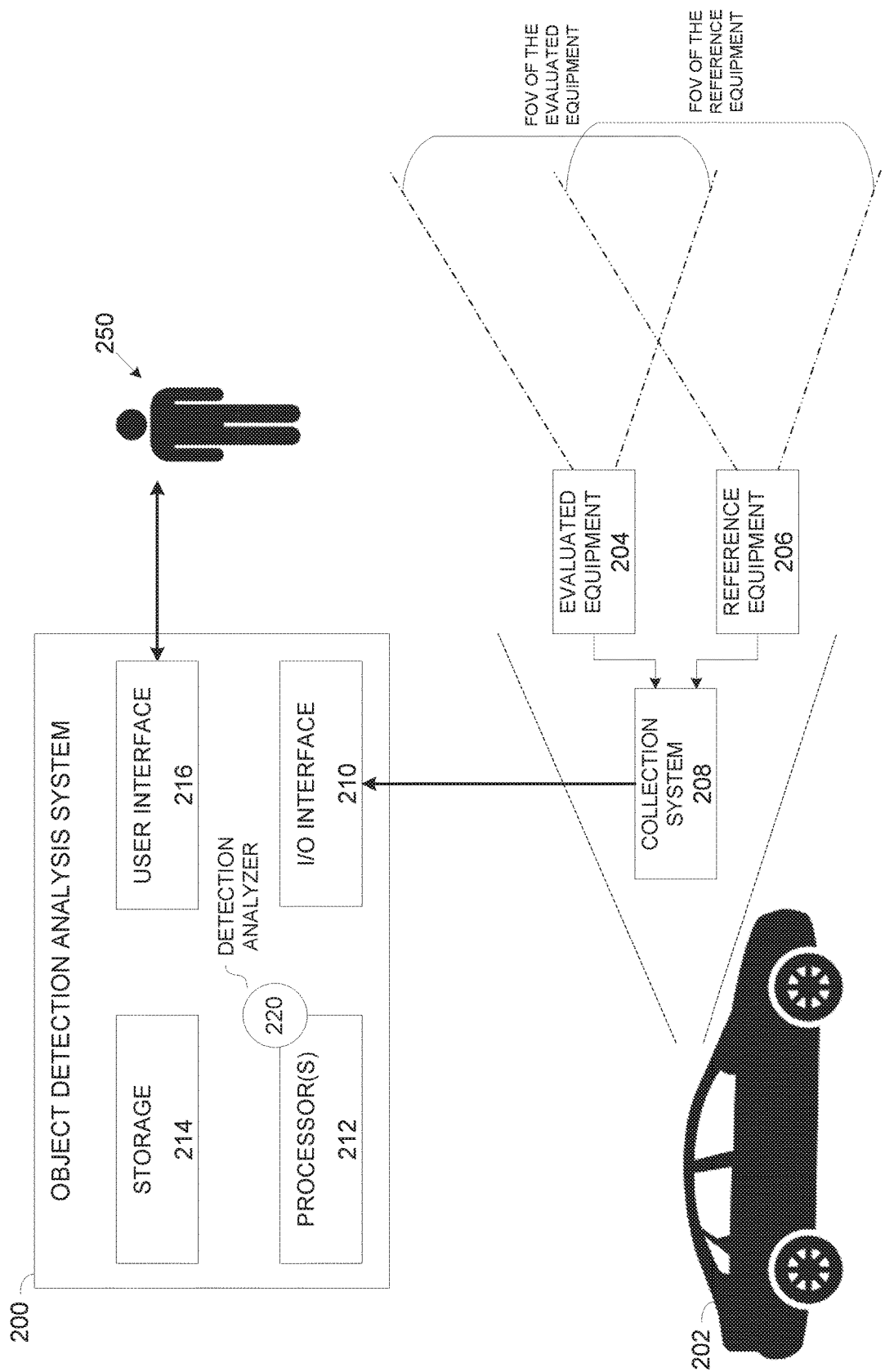
FIG. 2 is a schematic illustration of an exemplary system for validating object detection of an object detection equipment under test compared to validated reference object detection equipment, according to some embodiments of the present invention.

Reference is also made to FIG. 2, which is a schematic illustration of an exemplary system for validating object detection of an object detection equipment under test compared to validated reference object detection equipment, according to some embodiments of the present invention.

An exemplary object detection analysis system 200 may execute a process such as the process 100 to object detection evaluate an evaluated object detection equipment 204 which is under test comprising evaluated hardware (e.g. one or more sensors), evaluated algorithms and/or a combination thereof based on correlation of detected objects with objects detected by a reference object detection equipment 206 that is already tested and validated to provide accurate object detection. Optionally, the reference equipment 206 and its performance may be considered as validated in case the reference equipment 206 is produced, evaluated, validated and/or otherwise acknowledged by a global leader and and/or well-known global performance reference.

In particular, the evaluated object detection equipment 204, designated evaluated equipment 204 herein after, and the reference object detection equipment 206, designated reference equipment 204 herein after, are mounted on a vehicle 202 and configured to detect object in an environment of the vehicle 202. The vehicle 202 which may be a ground, aerial and/or naval vehicle, for example, a car, a truck, a motorcycle, a bicycle, a train, an aircraft, a drone, a helicopter, a boat, a ship, a submarine and/or the like. The vehicle 204 may include be a manually operated vehicle, a partially autonomous vehicle comprising one or more systems for controlling at least partially operation and/or movement of the vehicle and/or a fully autonomous capable of controlling the vehicle with no manual intervention.

The evaluated equipment 204 and the reference equipment 206 may collect sensory data during one or more trips of the vehicle 202 and may further analyze the sensory data to detect objects and classify the detected objects on the same time frame. The evaluated equipment 204 and the reference equipment 206 may each generate an object detection record comprising their captured sensory data, their classification data and/or further data relating to the detected objects. The evaluated equipment 204 and the reference equipment 206 may then transfer their records to a collection system 208 via one or more wired and/or wireless interconnections and/or networks, for example, a Universal Serial Bus (USB), a serial channel, a Controller Area Network (CAN) bus, a Local Area Network (LAN), a Wireless LAN (WLAN, e.g. Wi-Fi) a Radio Frequency (RF), a Bluetooth interface and/or the like.

The collection system 208 may further include one or more wired and/or wireless interconnection interfaces, for example, a USB interface, a serial port, a CAN bus interface, an RF interface, a Bluetooth interface, a cellular interface and/or the like for communicating with the object detection analysis system 200 to provide the object detection records generated by the evaluated equipment 204 and/or the reference equipment 206. The collection system 208 may optionally store the object detection records until delivered to the object detection analysis system 200. Optionally the collection system 208 is integrated with the evaluated equipment 204 and/or the reference equipment 206 such that evaluated equipment 204 and/or the reference equipment 206 may store their object detection records and directly communicate with the object detection analysis system 200.

The object detection analysis system 200, for example, a computer, a server, a computing node, a cluster of computing nodes and/or the like may include an Input/Output (I/O) interface 210, a processor(s) 212 for executing the process 100 and a storage 214 for storing code (program store) and/or data.

The I/O interface 210 may include one or more wired and/or wireless interconnection interfaces and/or network interfaces for communicating with the collection system 208, the evaluated equipment 204 and/or the reference equipment 206. Such interconnections and network interfaces, may include, for example, a USB interface, a serial port, a CAN bus interface, an RF interface, a Bluetooth interface, a cellular interface and/or the like.

The processor(s) 212, homogenous or heterogeneous, may include one or more processing nodes arranged for parallel processing, as clusters and/or as one or more multi core processor(s). The storage 214 may include one or more non-transitory persistent storage devices, for example, a hard drive, a Flash array and/or the like. The storage 214 may also include one or more volatile devices, for example, a Random Access Memory (RAM) component and/or the like. The storage 214 may further comprise one or more network storage resources, for example, a storage server, a network accessible storage (NAS), a network drive and/or the like accessible via the I/O interface 210.

The processor(s) 212 may execute one or more software modules such as, for example, a process, a script, an application, an agent, a utility, a tool, an Operating System (OS) and/or the like each comprising a plurality of program instructions stored in a non-transitory medium (program store) such as the storage 214 and executed by one or more processors such as the processor(s) 212. The processor(S) 212 may optionally utilize and/or facilitate one or more hardware modules (elements), for example, a circuit, a component, an Integrated Circuit (IC), an Application Specific Integrated Circuit (ASIC), a Field Programmable Gate Array (FPGA), a Digital Signals Processor (DSP), a Graphic Processing Units (GPU), an Artificial Intelligence (AI) accelerator and/or the like. as such, the processor(s) 212 may execute one or more functional modules, for example, a detection analyzer 220 utilized by one or more software modules, one or more of the hardware modules and/or a combination thereof.

The object detection analysis system 200 may further include a user interface 216 comprising one or more user interfaces, i.e. Human Machine Interfaces (HMI) for interacting with one or more users 250, for example, an operator, an object detection expert, a developer and/or the like. The HMI interfaces supported and/or provided by the user interface 216 may include, for example, a keyboard, a touchpad, a pointing device (e.g. mouse, trackball, etc.), a touchscreen, a display, a speaker, an earphone, a microphone and/or the like.

While it is possible that the object detection analysis system 200 is deployed in the vehicle 202, the object detection analysis system 200 may typically be separate from the vehicle 202 and may communicate, via the I/O interface 210, with the collection system 208, the evaluated equipment 204 and/or the reference equipment 206 to receive the data detection records generated by the evaluated equipment 204 and/or the reference equipment 206. The object detection analysis system 200 may communicate with the collection system 208, the evaluated equipment 204 and/or the reference equipment 206 during the trip of the vehicle 202 and/or on completion of the trip and/or part thereof.

Optionally, the object detection analysis system 200, specifically the detection analyzer 220 executed by the object detection analysis system 200 is implemented as one or more cloud computing services, platforms and/or applications, for example, an Infrastructure as a Service (IaaS), a Platform as a Service (PaaS), a Software as a Service (SaaS) and/or the like such as, for example, Amazon Web Service (AWS), Google Cloud, Microsoft Azure and/or the like.

In case the object detection analysis system 200 is implemented by a remote system and/or by the cloud based service(s), one or more of the users 250 may use a client device, for example, a computer, a tablet, a Smartphone and/or the like to communicate with the remote object detection analysis system 200 via one or more of the networks connecting to the object detection analysis system 200.

Each of the evaluated object detection equipment 204 and the reference object detection equipment 206 may include object detection hardware, specifically one or more sensors and/or one or more object detection algorithms (classifiers).

While it is possible that the evaluated equipment 204 and/or the reference equipment 206 may each include only object detection hardware or object detection algorithms, each of the evaluated equipment 204 and the reference equipment 206 may typically facilitate a complete object detection solution composing both hardware and algorithms.

The object detection hardware may comprise one or more sensors configured to monitor the environment of the vehicle 202 which may span a wide range of detection technologies and/or functional parameters, for example, capturing technology, spectrum, wave length, field of view (FOV), range, sampling frequency and/or the like. Each of the evaluated equipment 204 and the reference equipment 206 may therefore include one or more such sensors, for example, an imaging sensor, a LiDAR sensor, a RADAR sensor, SONAR and/or the like. The imaging sensor, for example, a camera, a video camera, a night vision camera, an Infrared camera, a thermal camera, a depth camera, a stereoscopic camera and/or the like may be deployed, configured and/or operated to produce an image and/or an imaging map (e.g. heat map, a depth map, etc.) of the environment of the vehicle 202. In another example, the LiDAR sensor which may employ one or more light emission technologies, for example, laser and/or the like, may be deployed, configured and/or operated to produce a range map to one or more objects detected in the environment of the vehicle 202. In another example, the RADAR sensor which may employ one or more radio waves transmission and reflection capture technologies may be deployed, either passive or active emitting systems, configured and/or operated to produce a range map to one or more objects detected in the environment of the vehicle 202. In another example, the SONAR sensor which may employ one or more ultrasonic waves transmission and deflection capture technologies may be deployed, configured and/or operated to produce a range map to one or more objects detected in the environment of the vehicle 202.

The evaluated equipment 204 and the reference equipment 206 may each utilize one or more sensors of a single type and technology, for example, only imaging sensor(s), only LiDAR sensor(s), only RADAR sensor(s), only SONAR sensor(s) and so on. However, it is possible that the evaluated equipment 204 and/or the reference equipment 206 may each use sensors of several types, for example, one or more imaging sensors coupled with one or more LiDAR sensors and/or other combinations.

However, the reference equipment 206 may be configured to include a set of one or more sensors which is sufficiently comprehensive and accurate to provide a reliable reference for evaluating and validating the object detection performance of the evaluated equipment 204. In particular, the set of sensors used by the reference equipment 206 may be sufficiently comprehensive and accurate compared to the sensors used by the evaluated equipment 204. For example, assuming the evaluated equipment 204 comprises one or more LiDAR sensors which are ranging sensors, the reference equipment 206 may be designed, configured and/or adjusted to include sensors which are capable to accurately and reliably measure ranges to detected objects, for example, one or more imaging sensors and one or more LiDAR sensors and/or one or more RADAR sensors.

Moreover, the reference equipment 206 may be configured to include a set of one or more sensors which are different from those used by the evaluated equipment 204. This may be done to prevent a scenario in which both the evaluated equipment 204 and the reference equipment 206 may experience and/or present similar errors originating from inherent deficiencies, limitations and/or failures of similar sensors used by both the evaluated equipment 204 and the reference equipment 206. For example, assuming the evaluated equipment 204 comprises one or more LiDAR sensors of a first type, the reference equipment 206 may be designed, configured and/or adjusted to include one or more LiDAR sensors of a second type, typically LiDAR sensor(s) of a type that was already tested and validated to provide high performance object detection functionality.

The object detection algorithm(s) used by the evaluated equipment 204 and the reference equipment 206 may be designed, configured, trained and/or otherwise adapted to detect objects bay analyzing the sensory data captured by the sensors, specifically to detect objects in the environment of a vehicle such as the vehicle 202. The object detection algorithms may be applied and/or utilized using one or more methods, techniques and/or algorithms as known in the art, for example, a machine learning model, a neural network, an SVM, an image processing algorithm, a computer vision algorithm, a signal processing algorithm and/or the like.

The object detection algorithm(s) may detect one or more attributes of each detected object, for example, spatiotemporal attributes and movement attributes as well as other attributes. The spatiotemporal attributes may include one or more spatial attributes such as, for example, a location, a direction, a speed, an acceleration, an advancement vector and/or the like. The spatiotemporal attributes may also include one or more temporal attributes, for example, a time of detection, a first time of detection, a last time of detection, a detection duration, and/or the like. The other attributes may include, for example, a physical dimension, a color, a shape, a texture, and/or the like. The object detection algorithm(s) may further classify one or more of the objects detected by the object detection hardware sensor(s) and include a classification label of the respective object as an attribute of the respective object.

Furthermore, the reference equipment 206 may be configured to utilize one or more object detection algorithms which are different from those used by the evaluated equipment 204. As described for the sensors, this may be done to prevent a scenario in which both the evaluated equipment 204 and the reference equipment 206 may experience and/or present similar errors originating from inherent deficiencies, limitations and/or failures of similar object detection algorithm(s) used by both the evaluated equipment 204 and the reference equipment 206. For example, assuming the evaluated equipment 204 employs a first object detection algorithm, the reference equipment 206 may be designed, configured and/or adjusted to employ a second object detection algorithm, typically an object detection algorithm which was already tested and validated to provide high performance object detection and/or classification capabilities.

The object detection records generated by each of the evaluated equipment 204 and/or the reference equipment 206 may therefore include attributes, specifically the spatiotemporal (spatial and temporal) attributes and optionally the other attributes of each object detected by the respective equipment.

In order to support correlation between objects detected by the evaluated equipment 204 and the reference equipment 206, the evaluated equipment 204 and/or the reference equipment 206 may both utilize a common time reference for logging and recording the temporal attributes identified for each detected object. The common time reference may be utilized using one or more methods, systems and/or services provided by system(s) or service(s) of the vehicle 202 and/or provided to the vehicle 202, for example, a common clock, a reference timer, a Global Positioning System (GPS) reference time and/or the like. Moreover, the evaluated equipment 204 and/or the reference equipment 206 may each time stamp each feature and/or attribute of each detected object with a time tag identifying the detection time of the respective feature and/or attribute. In particular, the evaluated equipment 204 and/or the reference equipment 206 may assign the timestamps according to the common time reference.

Additionally, in order to support the correlation between objects detected by the evaluated equipment 204 and the reference equipment 206, each of the sensors employed by the evaluated equipment 204 may be mounted, deployed and configured in the vehicle 202 such that the FOV of the sensor(s) overlaps at least partially with the FOV of the sensor(s) used by the reference equipment 206. This may ensure that at least some of the objects detected in the environment of the vehicle 202 may be in the FOV of both the sensor(s) used by the evaluated equipment 204 and the sensor(s) used by the reference equipment 206.

Figure 3:
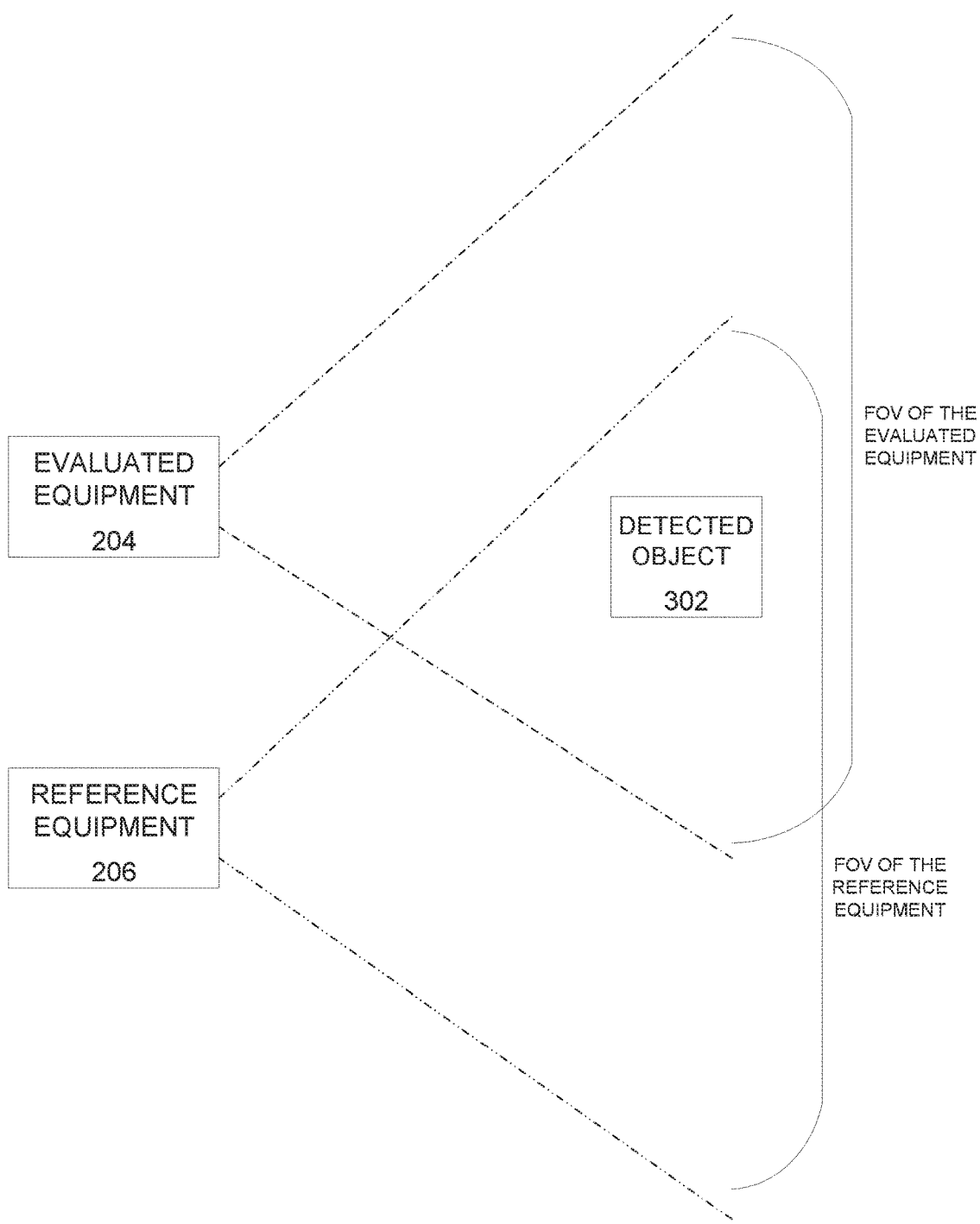
FIG. 3 is a schematic illustration of an object detected by validated and reference object detection equipment, according to some embodiments of the present invention.

Reference is now made to FIG. 3 which is a schematic illustration of an object detected by validated and reference object detection equipment, according to some embodiments of the present invention. An evaluated equipment such as the evaluated equipment 204 and a reference equipment such as the reference equipment 206 may be deployed, for example, mounted, integrated, attached and/or the like in a vehicle such as the vehicle 202. In particular, the evaluated equipment 204 and the reference equipment 206 are deployed such that the sets of one or more sensors used by each of the evaluated equipment 204 and the reference equipment 206 are capable to monitor the external environment of the vehicle 202 and capture sensory data depicting the environment.

The sensor sets used by the evaluated equipment 204 and the reference equipment 206 may be deployed, configured and/or adjusted to have an at least partially overlapping FOVs such that one or more objects 302 located in an intersecting (overlapping) region of the FOVs may be detectable both by the sensor set of the evaluated equipment 204 and the sensor set of the reference equipment 206, on the same time frame.

Moreover, the sensor(s) used by the evaluated equipment 204 and the reference equipment 206, specifically the FOVs of the sensors may be defined according to one or more spatial positioning systems in order to establish a common spatial reference between the sensor(s) used by the evaluated equipment 204 and the reference equipment 206. The spatial positioning system(s) may define one or more spatial positioning attributes for the common spatial reference of the sensors, for example, a position, a location, an orientation, a direction, an FOV and/or the like.

The spatial positioning system(s) may include one or more global spatial positioning systems and/or references, for example, a global coordinate system applied for the environment of the vehicle 202. The global coordinate system may be established and applied according to one or more global positioning systems, for example, a GPS, a common polar axis system and/or the like. Additionally and/or alternatively, the spatial positioning systems may include one or more relative spatial positioning systems and/or references, for example, a relative reference with respect to one or more virtual planes and/or virtual axes of the vehicle 202.

Optionally, the common spatial reference may be defined according to a relative initial spatial positioning of the evaluated equipment 204 with respect to the relative initial spatial positioning of the reference equipment 206 established once, periodically and/or on demand. For example, the relative initial spatial positioning of the evaluated equipment 204 with respect to the reference equipment 206 may be set once when installing the sensor(s) of the evaluated equipment 204 and/or the sensor(s) of the reference equipment 206, both are set on the same line of sight, on a rigid platform mutually vibrating. In another example, the relative initial spatial positioning of the evaluated equipment 204 with respect to the reference equipment 206 may be set prior to each trip of the vehicle 202. In another example, the relative initial spatial positioning of the evaluated equipment 204 with respect to the reference equipment 206 may be set periodically, for example, every two hours, every day, every week and/or the like. In another example, the relative initial spatial positioning of the evaluated equipment 204 with respect to the reference equipment 206 may be set on demand, for example, following a disruptive event in which the two sensor sets may have shifted with respect to each other.

Reference is made one again to FIG. 1.

As shown at 102, the process 100 starts with the detection analyzer 220 receiving a first record generated by the evaluated equipment 204 during a trip of the vehicle 202. The first record may include a plurality of attributes of one or more objects detected by the evaluated equipment 204 in the environment of the vehicle 202 during the trip of the vehicle 202 and/or part thereof.

In particular, the first record may include attributes of one or more dynamic objects detected by the evaluated equipment 204. The dynamic objects may include objects which are inherently mobile and as such may move at least part of the time with respect to the vehicle 202. Such dynamic objects may include, for example, other vehicles (e.g. cars, motorcycles, bicycles, trains, tram cars, etc.), pedestrians and/or the like. While one or more of the dynamic objects be static for a certain period of time and possibly the entire time it is detected by the evaluated equipment 204 and/or the reference equipment 206, the dynamic objects are inherently mobile and capable of moving.

The attributes identified by the evaluated equipment 204 for each detected dynamic object may include one or more spatiotemporal attributes, specifically one or more spatial attributes such as, for example, a location, a direction, a speed, an acceleration, an advancement vector and/or the like and one or more temporal attributes such as, for example, a time of detection, a first time of detection, a last time of detection, a detection duration, and/or the like. Essentially, the spatiotemporal attributes identified for each detected object include at least one spatial attribute and at least one temporal attribute.

The first record may further include one or more other (additional) attributes identified by the evaluated equipment 204 for one or more of the detected dynamic objects, for example, a physical dimension, a color, a shape, a texture, and/or the like. Moreover, the first record may include a classification, for example, a class label, a type label, and/or the like estimated for each of one or more of the detected dynamic objects by the evaluated equipment 204 specifically by the object detection algorithm(s) used by the evaluated equipment 204. The classification of one or more of the detected objects may be further coupled in the first record with a classification score indicating a confidence level that the classification of the respective object is correct.

As shown at 104, the detection analyzer 220 may receive a second record generated by the reference equipment 206 during the trip of the vehicle 202. The second record may include a plurality of attributes of one or more objects, in particular dynamic objects detected by the reference equipment 204 in the environment of the vehicle 202 during the trip of the vehicle 202 and/or part thereof.

As shown at 106, the detection analyzer 220 may correlate between one or more objects detected by the evaluated equipment 204 and respective object(s) detected by the reference equipment 206, on the same time frame, according to matching spatiotemporal attributes of the respective object(s) in the first and second records.

In particular, the detection analyzer 220 may correlate object(s) detected by both the evaluated equipment 204 and the reference equipment 206 according to one or more matching spatial attributes and one or more temporal attributes. This means that the detection analyzer 220 may determine that both the evaluated equipment 204 and the reference equipment 206 relate to the same object in case the respective object occupies the same space as expressed by the spatial attribute(s) at the same time as expressed by the temporal attribute(s).

Since the spatial positioning of the evaluated equipment 204 compared to the reference equipment 206 is defined and known, the detection analyzer 220 which is familiar with this spatial positioning information may spatially correlate, in space, between objects detected by the evaluated equipment 204 and objects detected by the reference equipment 206. In particular, the detection analyzer 220 may correlate between object(s) detected by both the evaluated equipment 204 and the reference equipment 206 according to the spatial attributes, for example, the location, the direction, the speed, the acceleration, the advancement vector and/or the like recorded in the first and second records for each object detected by the evaluated equipment 204 and the reference equipment 206 respectively.

Optionally, the detection analyzer 220 may adjust, manipulate and/or transform one or more of the spatial attributes recorded in one of the records compared to those recorded in the second record according to the relative spatial positioning of the evaluated equipment 204 and the reference equipment 206 with respect to each other. For example, assuming the evaluated equipment 204 is positioned to have an FOV that is shifted by 30 degrees compared to the FOV of the reference equipment 206. In such case, the detection analyzer 220 may adjust one or more of the spatial attributes, for example, the location of one or more objects recorded in the first record generated by the evaluated equipment 204 to shift by 30 degrees before comparing the spatial attributes recorded in the first and second records.

Similarly, since the evaluated equipment 204 and the reference equipment 206 both use the common time reference, the temporal attribute(s), for example, the time of detection, the first time of detection, the last time of detection, the detection duration, and/or the like recorded in both the first and second records may relate to the same time base. Matching temporal attributes may therefore express the same timing attributes identified for the detected objects and therefore the respective object may be correlated in the first and second records.

Optionally, the detection analyzer 220 may correlate between one or more objects detected by the evaluated equipment 204 and respective object(s) detected by the reference equipment 206 according to a match of one or more of the spatial attributes over a predefined time period. In particular, the predefined time period, for example, one millisecond, 100 milliseconds, half second, one second, etc. may be defined such that it is sufficiently short compared to a maximal speed (velocity) of the dynamic objects targeted and detected by the evaluated equipment 204 and the reference equipment 206. Expanding the correlation across the predefined time period may therefore not result in potentially missing a detectable object located in the FOV of the sensor(s). The predefined time period may be determined and/or identified based on one or more of the temporal attributes extracted from the spatiotemporal attributes identified for the respective object, for example, the detection time, a duration of detection and/or the like.

Expanding the correlation across the predefined time period may be done to align different sensor(s) which may be used by the evaluated equipment 204 compared to the sensor(s) used by the reference equipment 206. In particular, the different sensors may have different sampling times, different sampling frequencies and/or the like which may result in some deviation in the temporal (timing) attributes recorded in the first and second records for one or more detected objects. For example, assuming the evaluated equipment 204 utilizes a first sensor having a sampling time of 10 samples (e.g. frames) per second while the reference equipment 206 utilizes a first sensor having a sampling time of 30 samples per second. In such case a simple comparison between the temporal attributes, e.g. the sampling times recorded in the first and second records may result in a false no-match due to the different sampling timing. Therefore, by comparing the spatial attributes over the predefined time interval, for example, 1 second, the detection analyzer 220 may identify and determine that a certain object recorded in the first record over the predefined time period is the same object recorded in the second record during the same predefined time period. The detection analyzer 220 may therefore correlate the object accordingly as it was detected by both the evaluated equipment 204 and the reference equipment 206 taking into account the closest time frame that includes the sampling time of the sensors of both the evaluated equipment 204 and the reference equipment 206 as a one-time frame.

Optionally, the detection analyzer 220 may adjust one or more of the attributes identified for one or more of the objects by the evaluated equipment 204 and the reference equipment 206 and recorded accordingly in the first record and the second record respectively. The detection analyzer 220 may adjust the attributes in order to establish a common reference and a standard representation for sensors and/or sensory data which may be represented differently by the evaluated equipment 204 and the reference equipment 206. For example, assuming the sensor(s) used by the evaluated equipment 204 is positioned and/or aligned according to a first spatial positioning system and the sensor(s) used by the reference equipment 206 is positioned and/or aligned according to a second spatial positioning system. In such case, the detection analyzer 220 may adjust one or more of the spatial attributes originally recorded in the first record based on the first spatial positioning system to be expressed based on the second spatial positioning system or vice versa. In another example, assuming the reading of the sensor(s) used by the evaluated equipment 204 are expressed in a first unit, for example, meters per second while the readings of the sensor(s) used by the reference equipment 206 are expressed in a second unit, for example, kilometers per hour. In such case, the detection analyzer 220 may adjust one or more of the spatial attributes originally recorded in the first record using the first units to be expressed using the second units. In another example, the evaluated equipment 204 and the reference equipment 206 may express one or more of the spatial attributes according to different coordinate systems, for example, polar axis representation for a RADAR sensor and vector Cartesian axis representation for a LiDAR sensor. In such case, the detection analyzer 220 may adjust one or more of the spatial attributes, for example, velocity and/or direction attributes according to a common form and/or representation.

Moreover, the detection analyzer 220 may adjust the classification assigned by the evaluated equipment 204 and/or the reference equipment 206 to one or more of the detected objects. As stated herein before, it is desirable that the evaluated equipment 204 and the reference equipment 206 employ different object detection algorithms to avoid missing common errors which may be inherent to one or more of the object detection algorithms. Therefore, in case the different object detection algorithms use a different classification scheme, for example, different classes, different labels, and/or the like, the detection analyzer 220 may adjust the classification scheme employed by the evaluated equipment 204 and/or the reference equipment 206 to establish a common classification reference a standard representation between the classification schemes. For example, a first object detection algorithm employed by the evaluated equipment 204 may use a first classification scheme based on class labels such as, for example, car, truck, motorcycle, bicycle and/or the like while a second object detection algorithm used by the reference equipment 206 may apply a second classification scheme based on class labels such as, for example, 4-wheel vehicle, 2-wheel vehicle and/or the like. In such case the detection analyzer 220 may adjust one or more of the class labels originally recorded in the first record by the evaluated equipment accordingly to the first classification scheme to be expressed according to the second classification scheme or vice versa.

Based on the correlation, the detection analyzer 220 may determine whether an object detected by the evaluated equipment 204 is the same object detected by the reference equipment 206. The detection analyzer 220 may thus identify one or more objects that are detected by both of the evaluated equipment 204 and the reference equipment 206 and/or one or more objects which may be detected by only one of the evaluated equipment 204 or the reference equipment 206.

Moreover, since the attributes identified by the evaluated equipment 204 and the reference equipment 206 and recorded in the first and second records accordingly may include a classification of the object(s), the detection analyzer 220 may further identify objects which are detected by both the evaluated equipment 204 and the reference equipment 206 and are classified similarly or differently.

Figure 4:
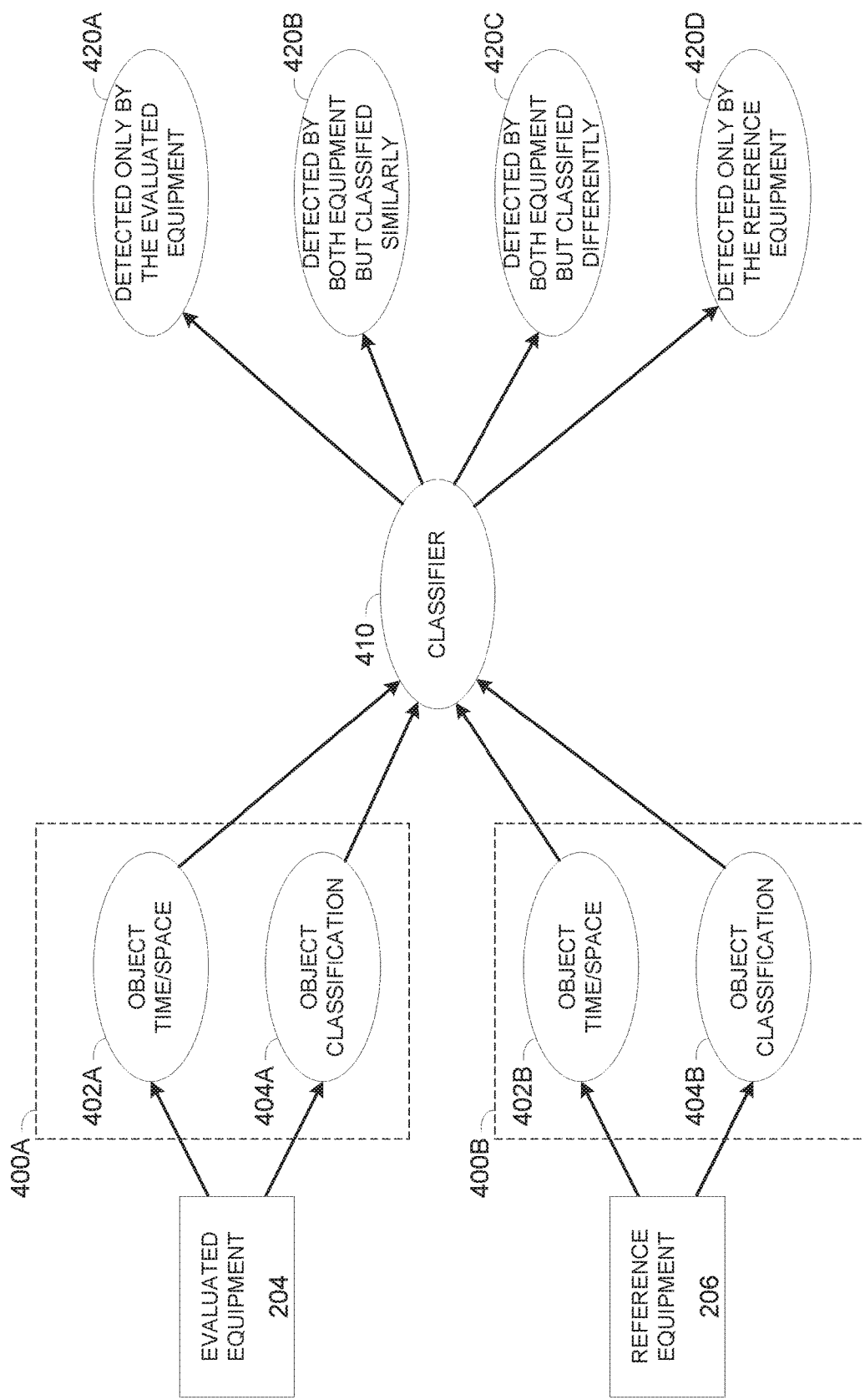
FIG. 4 is a schematic illustration of an exemplary sequence for classifying an object detected by an object detection equipment under test and/or by a reference object detection equipment, according to some embodiments of the present invention.

Reference is now made to FIG. 4, which is a schematic illustration of an exemplary sequence for classifying an object detected by an object detection equipment under test and/or by a reference object detection equipment, according to some embodiments of the present invention.

An evaluated equipment such as the evaluated equipment 204 deployed in a vehicle such as the vehicle 202 may detect one or more objects in the environment of the vehicle 202 during a trip of the vehicle 202 and/or part thereof. The evaluated equipment 204 may generate a first record 400A comprising spatiotemporal attributes 402A of each object detected by the evaluated equipment 204 which reflect the time and space of the respective detected object. The first record 400A may further include an object classification 404A, for example, a class label, a type label and/or the like estimated by the evaluated equipment 204 for the respective object.

Similarly, a reference equipment such as the reference equipment 206 deployed in the vehicle 202 may detect one or more objects in the environment of the vehicle 202 during the same trip of the vehicle 202 and/or part thereof. The reference equipment 206 may generate a second record 400B comprising spatiotemporal attributes 402B of each object detected by the reference equipment 206 which reflect the time and space of the respective detected object. The second record 400B may further include an object classification 404B estimated by the reference equipment 206 for the respective object.

A detection analyzer such as the detection analyzer 220 may employ one or more classifiers 410 which may analyze the first record 400A and the second record 400B and classify each recorded object into one of a plurality of groups. In one exemplary embodiment, the plurality of groups may include, for example, a group 420A of objects detected only by the evaluated equipment 204, a group 420D of objects detected only by the reference equipment 206, a group 420B of objects detected by both the evaluated equipment 204 and the reference equipment 206 and are classified similarly (e.g., with the same class label) and a group 420C of objects detected by both the evaluated equipment 204 and the reference equipment 206 but are classified differently (e.g., with different class labels).

Reference is made once again to FIG. 1.

As shown at 108, the detection analyzer 220 may analyze the attributes (spatiotemporal attributes and/or other attributes) of objects identified by the evaluated equipment 204 and recorded in the first record compared to the attributes of objects detected by the reference equipment 206 and recorded in the second record.

Specifically, the detection analyzer 220 may analyze the attributes of correlated objects detected by both the evaluated equipment 204 and the reference equipment 206 and compare the object(s)' attributes to identify similarities and/or differences. For example, assuming a certain object is correlated in the first and second records, the detection analyzer 220 may compare one or more of the spatiotemporal attributes of the object as recorded in the first record compared to the second record, for the speed, the advancement vector, the first time of detection, the detection duration and/or the like. In another example, the detection analyzer 220 may compare one or more of the other attributes of the object as recorded in the first record compared to the second record, for the speed, the size, the shape, the color, the texture and/or the like.

Based on the comparison, where the second record serves as a reference, the detection analyzer 220 may identify a level of detection of the evaluated equipment 204 as recorded in the first record, for example, correct detection, partially detection, detection deviation, wrong detection and/or the like. For example, based on the analysis and comparison of the attributes in the first and second records, the detection analyzer 220 may determine that the evaluated equipment 204 fails to accurately identify one or more of the attributes of one or more detected and correlated object. For example, the detection analyzer 220 may identify a speed difference between a speed attribute generated by the evaluated equipment 204 for one or more correlated objects compared to the speed attribute(s) generated for the correlated object(s) by the reference equipment 206. In another example, the detection analyzer 220 may identify a difference between a color attribute generated by the evaluated equipment 204 for one or more correlated objects compared to the color attribute(s) generated for the correlated object(s) by the reference equipment 206. In another example, the detection analyzer 220 may identify difference class label(s) assigned to one or more objects detected by the evaluated equipment 204 compared to the class label(s) generated for the correlated object(s) by the reference equipment 206.

The detection analyzer 220 may further analyze attributes identified for one or more objects detected by the evaluated equipment 204 which could not be correlated with respective object(s) detected by the reference equipment 206 and/or vice versa objects detected by the reference equipment 206 which could not be correlated with objects detected by the evaluated equipment 204. For example, based on the analysis of the first and second records, the detection analyzer 220 may determine that the evaluated equipment 204 detected one or more objects not detected by the reference equipment 206. While it may be possible that the evaluated equipment 204 outperforms the reference equipment 206, typically this may result from a false detection of the evaluated equipment 204 since the reference equipment 206 may include a more comprehensive sensor set and/or employ multiple object detection algorithms to complement each other and improve detection performance. In another example, based on the analysis of the first and second records, the detection analyzer 220 may determine that the evaluated equipment 204 failed to detect one or more objects detected by the reference equipment 206. In another example, based on the analysis of the first and second records, the detection analyzer 220 may determine that the attributes, specifically the spatiotemporal attributes identified by the evaluated equipment 204 for one or more detected may be significantly deviate from the spatiotemporal attributes identified for possibly corresponding object(s) such that they may not be correlated.

Optionally, the detection analyzer 220 may analyze raw sensory data captured and/or generated by the evaluated equipment 204 and/or the reference equipment 206 in order to evaluate the object detection performance of the evaluated equipment 204. This may be done to evaluate, asses and/or determine whether one or more differences in the object detection of the evaluated equipment 204 compared to the reference equipment 206 may be originate from the sensor(s) and/or from the object detection algorithm(s) used by the evaluated equipment 204. For example, the detection analyzer 220 may identify a difference in the attributes generated by the evaluated equipment 204 compared to the reference equipment 206 for one or more correlated objects and, based on the analysis of the sensory data, the detection analyzer 220 may identify that the raw sensory data captured by the sensor(s) used by the evaluated equipment 204 is accurate. In such case, the detection analyzer 220 may determine that the root cause for the difference may originate from the object detection algorithm(s) employed by the evaluated equipment 204. However, in case there is a difference between in the raw sensory data itself as captured by the sensor(s) used by the evaluated equipment 204 and those used by the reference equipment 206, the detection analyzer 220 may determine that the root cause for the difference originates from the sensor(s) used by the evaluated equipment 204.

Moreover, the detection analyzer 220 may analyze the raw sensory data generated by the evaluated equipment 204 compared to raw sensory data generated by the reference equipment 206 in order to identify correlation in the captured sensory data and evaluate the sensory data capturing performance of the evaluated equipment 204 compared to the reference equipment 206.

Optionally, the process 100 may be applied to ensure consistency of the detection analyzer 220, the reference equipment 206 and/or the evaluated equipment 204. To this end, both the evaluated equipment 204 and the reference equipment 206 may utilize the same object detection equipment (different units of the same equipment), for example, the evaluated equipment 204, the reference equipment 206 or another independent object detection equipment. In such case the difference between the first record and the second record should be insignificant. In case a significant difference is identified between the first and second records, the object detection equipment used for both the evaluated equipment 204 and the reference equipment 206 should be analyzed and checked to determine its integrity and/or consistency. The detection analyzer 220 may be also analyzed to check and determine whether it correctly correlates between the objects detected in the first and second records.

Optionally, the detection analyzer 220 may apply one or more filters for the analysis and comparison of the first and second records to identify differences between attributes recorded in the records. Each of the filters may identify one or more features, objects and/or attributes which are redundant, irrelevant, ineffective and/or the like which the detection analyzer 220 should therefore not compare and/or analyze. For example, one or more filters may define one or more certain attributes for which a large and sufficient comparison dataset is already available and the detection analyzer 220 should therefore not compare and/or analyze the certain attribute(s). In another example, one or more filters may define one or more objects and/or features which are already validated in the evaluated equipment 204 and require no further validation and the detection analyzer 220 should therefore avoid comparing and/or analyzing attribute(s) relating to the validated objects and/or features. In another example, one or more filters may be applied to prevent the detection analyzer 220 from analyzing attributes and/or sensory data which is irrelevant, for example, ranging data which may be derived from imagery data captured by one or more imaging sensors. In another example, a certain object detection algorithm may be incapable of classifying certain dynamic objects, for example, bicycles and the detection analyzer 220 should therefore avoid comparing and/or analyzing attribute(s) relating to detected bicycle objects. Applying the filters may significantly reduce one or more computing resources applied by the detection analyzer 220 for the analysis and comparison, for example, processing resources, processing time, storage resources and/or the like.

As shown at 110, which is an optional step, the detection analyzer 220 may optionally identify one or more error patterns in the detection functionality of the evaluated equipment 204, specifically with respect to dynamic object(s). Optionally, one or more of the identified error patterns may be traced to the reference equipment 206, for example, in cases where the validated equipment 204 outperforms the reference equipment 206 in detection of one or more objects, specifically dynamic object(s).

Specifically, the detection analyzer 220 may detect and identify the error pattern(s) based on analysis of the attributes identified by the evaluated equipment 204 for a plurality of objects compared to the attributes identified by the reference equipment 206 for a plurality of respective correlated and/or uncorrelated objects. For example, based on the analysis of the classification labels assigned by the evaluated equipment 204 to a plurality of objects compared to the classification labels assigned by the reference equipment 206 to the correlated objects, the detection analyzer 220 may detect that the evaluated equipment 204 constantly and/or occasionally estimates a motorcycles as a bicycles. In another example, based on the analysis, the detection analyzer 220 may detect that the evaluated equipment 204 presents an offset of 15 degrees in a horizontal axis for the location and/or positioning of detected objects. In another example, based on the analysis, the detection analyzer 220 may detect that the evaluated equipment 204 occasionally fails to detect objects located in a certain location, section and/or segment of the FOV of the sensor(s) used by the evaluated equipment 204 (false negative). In another example, based on the analysis, the detection analyzer 220 may detect that the evaluated equipment 204 constantly or occasionally falsely detects objects which are not really present in the FOV of the sensor(s) used by the evaluated equipment 204 (false positive). In another example, based on the analysis, the detection analyzer 220 may detect that the evaluated equipment 204 fails to accurately detect slow dynamic objects (e.g. pedestrians) which are partially obscured by another object (e.g. parking cars, poles, etc.). In another example, based on the analysis, the detection analyzer 220 may detect that the evaluated equipment 204 fails to accurately differentiate and detect motorcycles moving together with larger vehicles (e.g. car, bus, truck, etc.) in their background.

As shown at 112, the detection analyzer 220 may output an indication of one or more differences identified based on the analysis between the first record and the second record. As such, the detection analyzer 220 may output indications for one or more differences identified between the attributes recorded in the first record for one or more detected objects and the attributes recorded in the second record for the respective correlated object(s). The detection analyzer 220 may further output indications for one or more objects detected by the reference equipment 206 and recorded accordingly in the second record which were not detected by the evaluated equipment 204 and are thus not recorded in the first record. Complementary, the detection analyzer 220 may output indications for one or more objects detected by the evaluated equipment 204 and recoded accordingly in the first record which were not detected by the reference equipment 206 and are hence not recorded in the second record.

The detection analyzer 220 may generate and output one or more records, for example, a file, a table, a list, an image and/or the like comprising the difference indications in one or more of a plurality of representations, forms and/or formats. For example, the detection analyzer 220 may generate one or more comparison charts presenting the differences between objects detected by the evaluated equipment 204 objects detected by the reference equipment 206. In another example, the detection analyzer 220 may generate one or more comparison clips comprising the raw sensory data (e.g. images, range maps, heat maps, etc.) and indicating (e.g. circling, highlighting, etc.) differences between attributes of object(s) as recorded in the first record compared to the attributes of the of the respective correlated object(s) as recorded in the second record. The detection analyzer 220 may further operate a display provided by the I/O interface 210 to present the comparison chart(s) and/or the comparison clip(s) to the user(s) 250.

In case the detection analysis system 200 is remote to one or more of the users 250, the detection analyzer 220 may generate one or more of the comparison charts and/or the comparison clips and transmit them to the client device used by one or more of the users 250 and further instruct the client device(s) to present them to the respective user(s) 250.

The detection analyzer 220 may further output one or more of the detected error pattern(s) if exist.

The difference indications generated by the detection analyzer 220 and optionally the detected error pattern(s) may be analyzed by one or more of the users 250, specifically experts, developers and/or the like in attempt to identify and characterize failures in the evaluated equipment 204. The users(s) 250 may then redesign, adjust, adapt and/or otherwise fix the evaluated equipment 204 to improve the object detection performance (e.g. accuracy, reliability, consistency, etc.), reduce an error and/or failure rate and/or the like.

Optionally, the detection analyzer 220 applies one or more filters for the generation of the difference record(s) to exclude differences realign to one or more features, objects and/or attributes from the difference indications record(s). The filter(s) may define exclusion of one or more of the features, objects and/or attributes which are redundant, irrelevant, ineffective and/or the like. For example, one or more filters may define one or more objects and/or features which are already validated in the evaluated equipment 204 and require no further validation and the detection analyzer 220 should therefore avoid indicating attributes relating to the validated objects and/or features. Applying the filters may significantly reduce the amount of data presented to the user(s) 250 thus allowing them to focus on comparison and analysis of one or more specific aspects, features, operational parameters, and/or functionality of the evaluated equipment 204. Filtering the redundant, irrelevant, ineffective data may therefore significantly reduce the time required by the user(s) 250 to analyze the difference record(s) in attempt to identify specific errors and/or failures in the evaluated equipment 204.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant systems, methods and computer programs will be developed and the scope of the terms sensor and object detection algorithm are intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, an instance or an illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals there between.

The word "exemplary" is used herein to mean "serving as an example, an instance or an illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

In addition, any priority document(s) of this application is/are hereby incorporated herein by reference in its/their entirety.

What is claimed is:

1. A method of automatically evaluating detection accuracy of dynamic objects by equipment under test, comprising:
   using at least one processor for:
      receiving a first record generated by an evaluated equipment under test which is deployed in a vehicle, the first record comprising a plurality of attributes of each dynamic object detected by the evaluated equipment in an environment of the vehicle;
      receiving a second record generated by a validated reference equipment deployed in the vehicle, the second record comprising a plurality of attributes of each dynamic object detected in the environment by the reference equipment;
      identifying at least one dynamic object appearing in both said first record and said second record by detecting when said at least one dynamic object occupies a same space at a same time in both said first record and said second record, by correlating between the at least one dynamic object detected by the evaluated equipment and a respective dynamic object detected by the reference equipment according to a match between at least one spatial attribute and at least one temporal attribute of the plurality of attributes of the respective dynamic object in the first record and in the second record;
      analyzing at least some of the plurality of attributes of the respective dynamic object in the first record compared to respective attributes of the respective dynamic object in the second record;
      analyzing sensory data captured by the evaluated equipment compared to corresponding sensory data captured by the validated reference equipment to evaluate performance of the evaluated equipment;
      outputting an indication of at least one difference between the first record and the second record identified based on the analysis; and
      outputting evaluation results of the analysis of the performance of the evaluated equipment.

2. The method of claim 1, further comprising analyzing a plurality of differences identified between the first record and the second record to identify at least one error pattern in the detection of the at least one dynamic object by at least one of: the evaluated equipment and the reference equipment.

3. The method of claim 1, wherein the evaluated equipment and the reference equipment each comprises at least one member of a group consisting of: a sensor and an object detection algorithm.

4. The method of claim 3, wherein the sensor is a member of a group consisting of: an imaging sensor, a LiDAR sensor, a RADAR sensor and an ultrasonic sensor.

5. The method of claim 1, wherein the vehicle is a member of a group consisting of: a ground vehicle, an aerial vehicle and a naval vehicle.

6. The method of claim 1, wherein the at least one spatial attribute which is a member of a group consisting of: a location, a direction, a speed, an acceleration and an advancement vector.

7. The method of claim 1, wherein the at least one spatial attribute is defined according to at least one global coordinate system applied for the environment and/or relatively to the vehicle.

8. The method of claim 1, wherein the at least one spatial attribute is defined according to a relative initial spatial positioning of the evaluated equipment with respect to the relative initial spatial positioning of the reference equipment, the spatial positioning comprises at least one member of a group consisting of: a position, a location, a direction, and a field of view.

9. The method of claim 1, wherein the at least one temporal attribute comprising: a time of detection, a first time of detection, a last time of detection and a detection duration, wherein the at least one temporal attribute is based on a common time reference.

10. The method of claim 1, further comprising correlating between the at least one object and the respective object according to a match between the at least one spatial attribute in the first record and in the second record over a predefined time period determined based on the at least one temporal attribute in the first record and in the second record.

11. The method of claim 1, wherein the plurality of attributes comprises at least one member of a group consisting of: a classification label, a physical dimension, a color, a shape and a texture.

12. The method of claim 11, further comprising adjusting at least one of the plurality of attributes of the respective object extracted from the first record or the second record to form a standard representation of the at least one attribute for the comparison analysis.

13. The method of claim 1, further comprising classifying each object detected by at least one of the evaluated equipment and the reference equipment into one of a plurality of groups based on the correlation, the plurality of groups comprising: a first group of objects detected only by the reference equipment, a second group of objects detected only by the evaluated equipment, a third group of objects detected by both the evaluated equipment and the reference equipment and classified similarly and a fourth group of objects detected by both the evaluated equipment and the reference equipment but classified differently.

14. The method of claim 1, further comprising excluding at least one of a plurality of detected objects from the difference indication according to at least one filter.

15. The method of claim 1, further comprising in case both the evaluated equipment and the reference equipment utilize the same object detection equipment, a difference between the first record and the second record is insignificant.

16. The method of claim 1, wherein said evaluated equipment and said reference equipment deploy sensors having at least partially overlapping FOV (Field Of View) ensuring at least some of the object detected in the environment of said vehicle appear in said at least partially overlapping FOV region.

17. The method of claim 1, wherein said performance of the evaluated equipment is at least one of accuracy, reliability, consistency and integrity.

18. A system for automatically evaluating accuracy of dynamic objects by equipment under test, comprising:
an input interface;
an output interface; and
at least one processor coupled to the input interface and to the output interface, the at least one processor executing a code comprising:
code instructions to receive, via the input interface, a first record generated by an evaluated equipment under test which is deployed in a vehicle, the first record comprising a plurality of attributes of each dynamic object detected by the evaluated equipment in an environment of the vehicle during a limited time interval,
code instructions to receive, via the input interface, a second record generated by a validated reference equipment deployed in the vehicle, the second record comprising a plurality of attributes of each dynamic object detected in the environment by the reference equipment during the limited time interval,
code instructions to identify at least one dynamic object appearing in both said first record and said second record by detecting when said at least one dynamic object occupies a same space at a same time in both said first record and said second record, by correlating between the at least one dynamic object detected by the evaluated equipment and a respective dynamic object detected by the reference equipment according to a match between at least one spatial attribute and at least one temporal attribute of the plurality of attributes of the respective dynamic object in the first record and in the second record,
code instructions to analyze at least some of the plurality of attributes of the respective dynamic object in the first record compared to respective attributes of the respective dynamic object in the second record,
code instructions to analyze sensory data captured by the evaluated equipment compared to corresponding sensory data captured by the validated reference equipment to evaluate performance of the evaluated equipment,
code instructions to output an indication of at least one difference between the first record and the second record identified based on the analysis, and
code instructions to output evaluation results of the analysis of the performance of the evaluated equipment.

* * * * *